United States Patent [19]

Underwood

[11] Patent Number: 4,958,802

[45] Date of Patent: Sep. 25, 1990

[54] STOP VALVE

[75] Inventor: David T. Underwood, Richardson, Tex.

[73] Assignee: United States Brass Corporation, Plano, Tex.

[21] Appl. No.: 178,475

[22] Filed: Apr. 7, 1988

[51] Int. Cl.[5] ............................................. F16K 5/04
[52] U.S. Cl. .................................. 251/310; 251/214; 251/904
[58] Field of Search ............... 251/309, 310, 312, 317, 251/900, 904, 214, 292, 304

[56] References Cited

U.S. PATENT DOCUMENTS

| 3,426,795 | 2/1909 | Muller | 251/310 X |
|---|---|---|---|
| 3,540,694 | 11/1970 | Cornelius | 251/292 X |
| 4,262,880 | 4/1981 | Rambo et al. | 251/309 X |
| 4,425,935 | 1/1984 | Gonzalez | 137/315 |
| 4,513,771 | 4/1985 | Thomas et al. | 251/292 X |

FOREIGN PATENT DOCUMENTS 378119  3/1964  Switzerland ........................ 251/310

Primary Examiner—John C. Fox
Attorney, Agent, or Firm—Arthur F. Zobal; Geoffrey A. Mantooth

[57] ABSTRACT

A stop valve has a valve body, a stem, and a handle. The valve body has a cylindrical cavity, which has a side wall and a first end wall, an inlet opening and an outlet opening, both of which communicate with the cylindrical cavity. The outlet opening has a side wall that intersects with the cylindrical cavity side wall; the intersection of which is chamfered. The valve stem has a cylindrical cavity portion which is located in the valve body cylindrical cavity and a handle portion which protrudes from the cylindrical cavity portion through an opening in the first end wall. The stem has an outlet seal ring and a stem seal O-ring. The stem seal O-ring is retained on the stem by a flange portion having a diameter slightly greater than the inside diameter of the O-ring. The stem has retaining ears to retain the stem in position in the valve body independently of the handle. The handle has a rectangular opening that matingly engages a drive portion on the stem that includes two members each with a rectangular cross-section. As the handle is assembled onto the stem, the two members flex inwardly until lips on the two members are able to matingly engage shoulders in the handle. The lips and shoulders are tapered so that as the handle is pulled away from the valve, the retaining action of the lips and shoulders is increased.

3 Claims, 3 Drawing Sheets

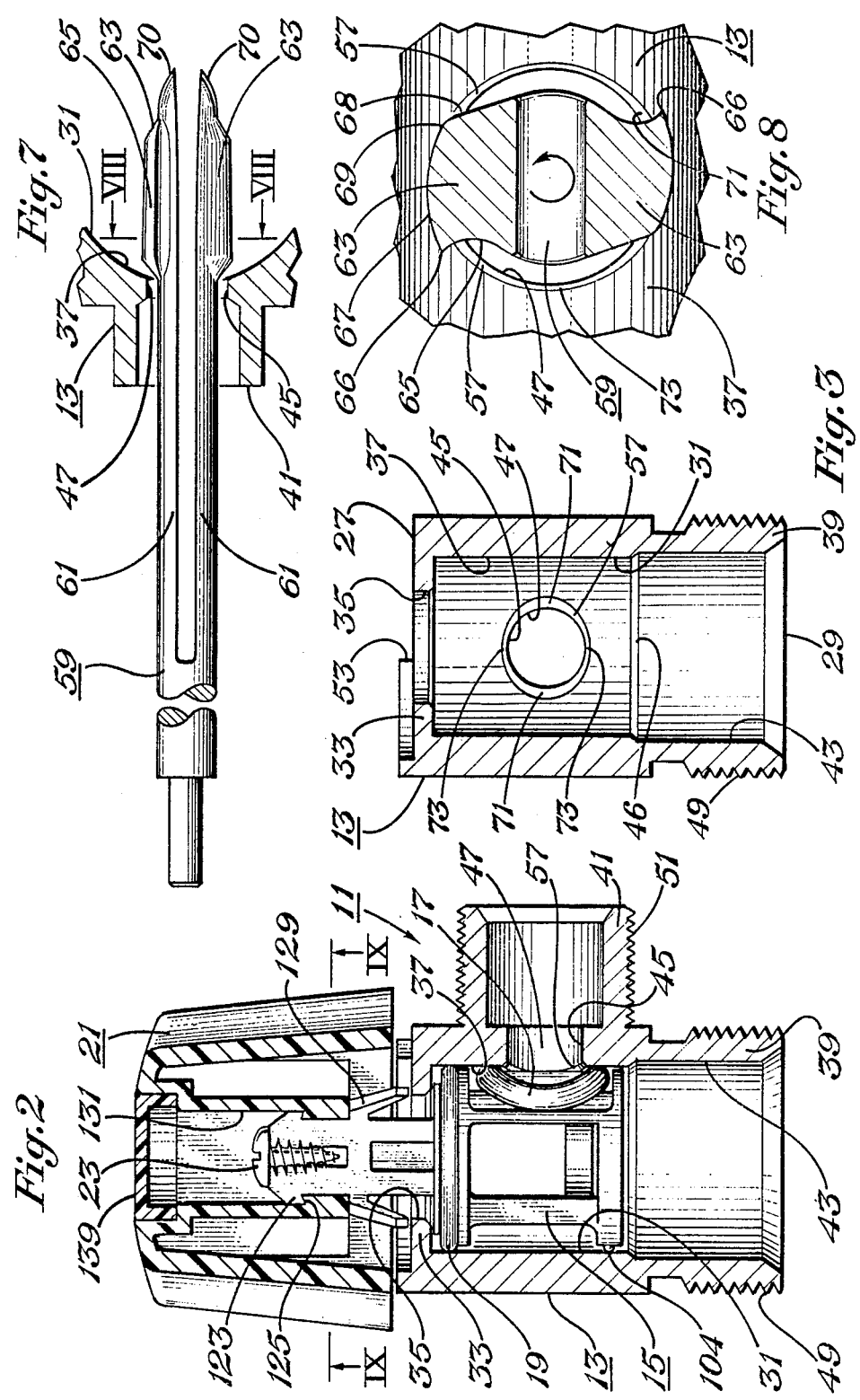

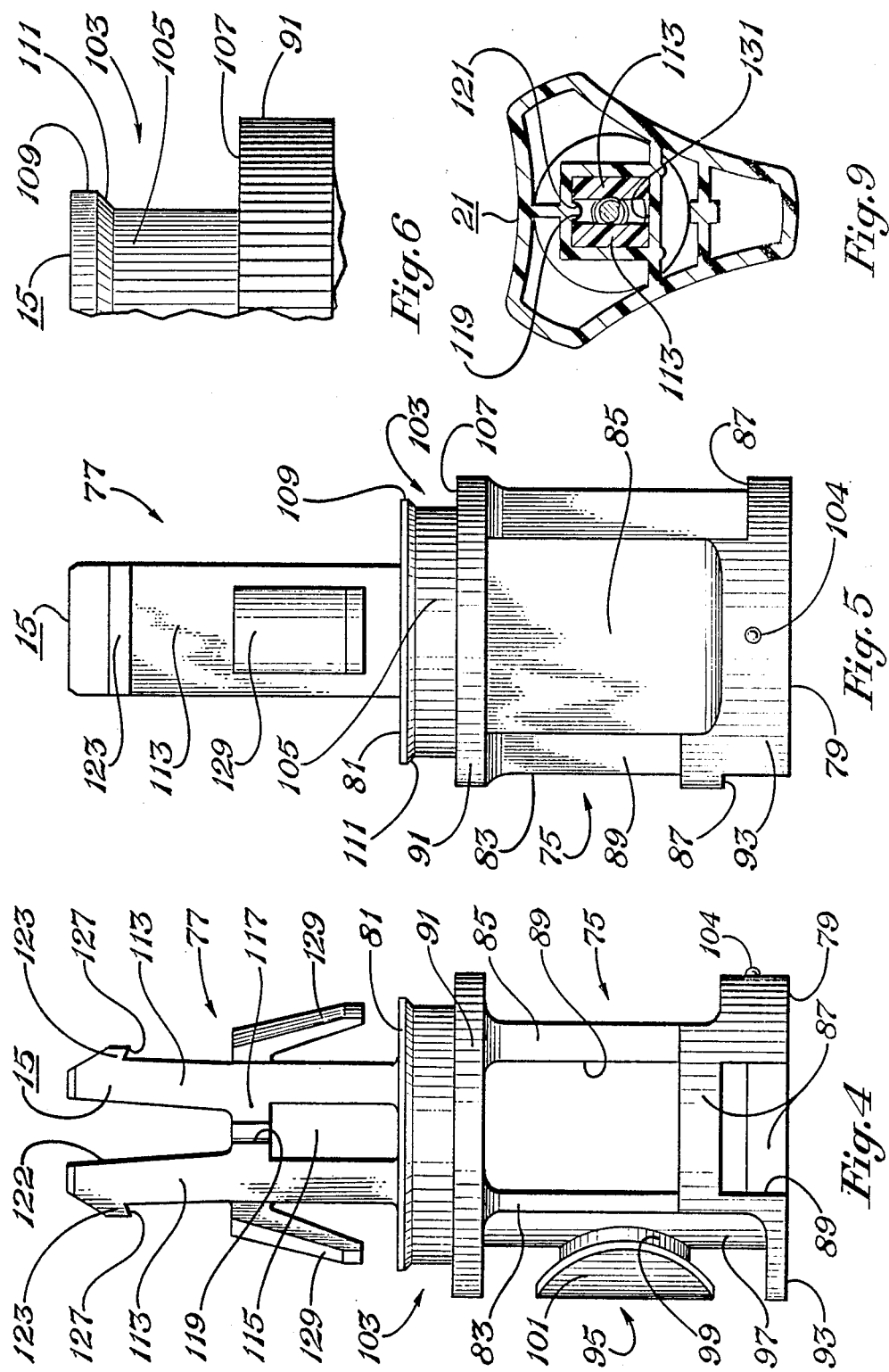

STOP VALVE

FIELD OF THE INVENTION

The present invention relates to improvements in plumbing valves, particularly to stop valves such as are used in water supply lines servicing sinks, lavatories, toilets, and the like.

BACKGROUND OF THE INVENTION

One type of prior art plumbing stop valve, which valve is in common use, has a metal valve stem in a metal valve body. The stem and body have large rectangular threads that matingly engage each other, and the stem has a seal at one end. The stem is rotated several turns to move to either the open or the closed position. A serious disadvantage of this type of stop valve is that after long periods of disuse, corrosive or mineral buildup on the threads causes the valve stem to freeze and thus renders the valve inoperable.

Efforts to develop a stop valve that does not freeze up are exemplified by U.S. Pat. Nos. 4,078,764 and 4,609,177. The stop valves disclosed in these two patents utilize rubber sealing member which closes the outlet opening by completely covering the opening. When the valve is in the closed position, water pressure forces the sealing member to bulge into the outlet opening causing difficulty in turning the stem from the closed position. In addition, the intersection between the outlet opening and the cavity containing the sealing member is a sharp edge which abrades the sealing members.

The bulging problem is eliminated by another type of prior art stop valve that utilizes a plastic valve body and a plastic stem. The plastic stem has an O-ring that can be made to surround the outlet opening to thus seal the outlet opening off from the inlet opening. The stem is rotated a fraction of a turn to move the O-ring to either the open or the closed position. Even with a plastic valve body, the O-ring is still abraded by the intersection between the outlet opening and the cavity containing the O-ring. The abrasion of the O-ring is reduced somewhat by reducing the compression on the O-ring and relying on water pressure to provide the requisite compressive forces, but such a valve will not seal properly under low water pressure. Furthermore, plastic valve bodies are considered by the industry to be inferior to metal valve bodies.

Prior art stop valves also suffer from inadequate handle mounting arrangements. Prior art handles are prone to failure if much torque is applied, as is often done when attempting to unstick a frozen stop valve. U.S. Pat. No. 4,609, 177 is exemplary of such a handle arrangement. Also, prior art stop valve stems rely on the valve handles to maintain the position of the stem inside of the valve body. In the event the handle is removed, the stem can be accidentally dislodged.

It is the objective of this invention to provide an improved stop valve that is not subject to the above mentioned disadvantages.

The market for stop valves is highly competitive with the result that cost reductions are important. It is accordingly the further objective of this invention to provide an improved stop valve which is functionally sound and durable and which can be manufactured more economically than those of the prior art.

SUMMARY OF THE INVENTION

The plumbing valve of the present invention includes a valve body, a valve stem, and a handle. The valve body, which is made of metal, has first and second ends and a cylindrical cavity therein. The cylindrical cavity has a first end wall and a side wall. The valve body has an inlet opening that communicates with the cylindrical cavity and an outlet opening that also communicates with the cylindrical cavity. The outlet opening has a side wall that intersects with the cylindrical cavity side wall. The stem has a handle portion for coacting with the handle and a cylindrical cavity portion which is located in the valve body cylindrical cavity. The handle portion protrudes from the cylindrical cavity through an opening in the first end wall. The stem is made of plastic and is rotatable between open and closed positions. The stem has stem seal means for sealing around the valve stem at a location that is adjacent to the opening in the first end wall. The cylindrical cavity portion of the stem has outlet seal means for sealing off the outlet opening from the inlet opening when the stem is in the closed position. The outlet seal means comprises a seal ring.

The intersection of the outlet opening side wall and the cylindrical cavity side wall is chamfered by inserting a unique chamfering tool into the cylindrical cavity through the outlet opening, and then simultaneously rotating and extracting the chamfering tool from the cylindrical cavity.

In one aspect of the present invention, the outlet seal ring is retained onto the periphery of the valve stem so as to closely encircle the chamfered intersection. The outlet seal ring is retained on the stem by outlet seal retainer means which comprises a cylindrical projection that projects radially outward and a flange on the end of the cylindrical projection. The flange is shaped so as to conform to the cylindrical cavity side wall. The flange serves to shape the outlet seal ring into conformance to the cylindrical cavity side wall.

Because the intersection of the cylindrical cavity side wall and the outlet opening side wall is chamfered, the outlet seal ring can be moved across the intersection between the open and closed positions without suffering from the abrasion problem experienced in prior art valves. The absence of abrasion of the outlet seal ring allows the outlet seal ring to be compressed between the stem and the valve body to such a degree that a seal can be maintained independent of water pressure and within suitable manufacturing tolerences. The chamfering of the intersection of the cylindrical cavity and the outlet opening thus provides for a long lasting and reliable sealing arrangement at a low cost.

In another aspect of the present invention, the stem seal means comprises an O-ring and is retained onto the stem by stem O-ring retainer means. The stem O-ring retainer means includes a cylindrical surface which is coaxial with the axis of rotation of the stem, a shoulder portion positioned adjacent to the cylindrical surface and sized to retain the O-ring on the cylindrical surface, and a flange portion positioned adjacent to the cylindrical surface such that the cylindrical surface is interposed between the flanged portion and the shoulder portion. The flange portion has a diameter that is slightly greater than the inside diameter of the stem O-ring such that the stem O-ring may be assembled onto the cylindrical surface by passing over the flange portion without undue stretching, yet the flange portion serves to retain the stem O-ring on the cylindrical surface during assembly operations.

The flange portion has an inclined surface that is contiguous to the cylindrical surface. The inclined surface enhances the sealing action of the stem O-ring. As water pressure is applied to the assembled valve, the stem O-ring is forced in the direction of the stem handle portion and against the inclined surface, wherein the inclined surface causes the stem O-ring to distort slightly in an outward direction, and against the cylindrical cavity side wall.

Still another aspect of the present invention is that the stem O-ring and the outlet seal ring both seal on the same surface of the cylindrical cavity side wall, simplifying the manufacturing of the valve body and thus reducing the cost.

The plastic valve stem is designed so as to allow its manufacture with a two-part mold, thus reducing manufacturing costs over prior art stems which require a more complex molding arrangement. The stem also provides for water flow through the stem sides to allow its use in either a right angle valve body, where the inlet is 90 degrees apart from the outlet, or a straight through valve body, where the inlet is 180 degrees apart from the outlet. Such a stem design increases its flexibility and further reduces cost.

Another aspect of the present invention involves the stem retainer ears, which operate to retain the stem inside of the valve body independently of the handle. The stem retainer ears are on the stem handle portion. The flexible ears bend radially inward when the stem handle portion is inserted in the first end wall opening and then expand radially outward when the ears have passed through the opening, to a diameter that is greater than the diameter of the opening. If the handle should ever be dislodged from the stem, the stem retainer ears maintain the stem position inside of the valve body, thereby insuring the integrity of the seals.

Still another aspect of the present invention involves the drive arrangement between the handle and the stem. Unlike prior art valves which typically use a splined shaft, the drive portion of the stem, which is made up of two members, each of which is rectangular in transverse cross-section to form a drive portion with a generally rectangular cross-section, and the corresponding rectangular opening in the handle, which is rectangular in transverse cross-section, provides a strong drive arrangement with a greatly lessened chance of failure. Furthermore, the handle is securely fastened to the stem by way of lips that have a taper which matingly engage tapered shoulders of the handle. As the handle is pulled away from the valve body, the handle shoulders increasingly grip the lips to enhance the retaining action. A stem screw may be inserted between the rectangular members to further enhance the retaining action.

BRIEF DESCRIPTION OF THE DRAWINGS

FIG. 2 is a longitudinal cross-sectional view of the stop valve.

FIG. 3 is a longitudinal cross-sectional view of the valve body taken along lines III—III of FIG. 1.

FIG. 4 is a side view of the valve stem.

FIG. 5 is another side view of the valve stem.

FIG. 6 is an enlarged view of the stem seal retainer portion of the valve stem.

FIG. 7 is a schematic fragmentary transverse cross-sectional view of the valve body outlet, illustrating the method of the present invention of chamfering the intersection of the outlet opening and the cylindrical cavity.

FIG. 8 is a schematic fragmentary cross-sectional view, taken at lines VIII—VIII of FIG. 7.

FIG. 9 is a transverse cross-sectional view taken at lines IX—IX of FIG. 2.

DESCRIPTION OF THE PREFERRED EMBODIMENT

Figure 1:
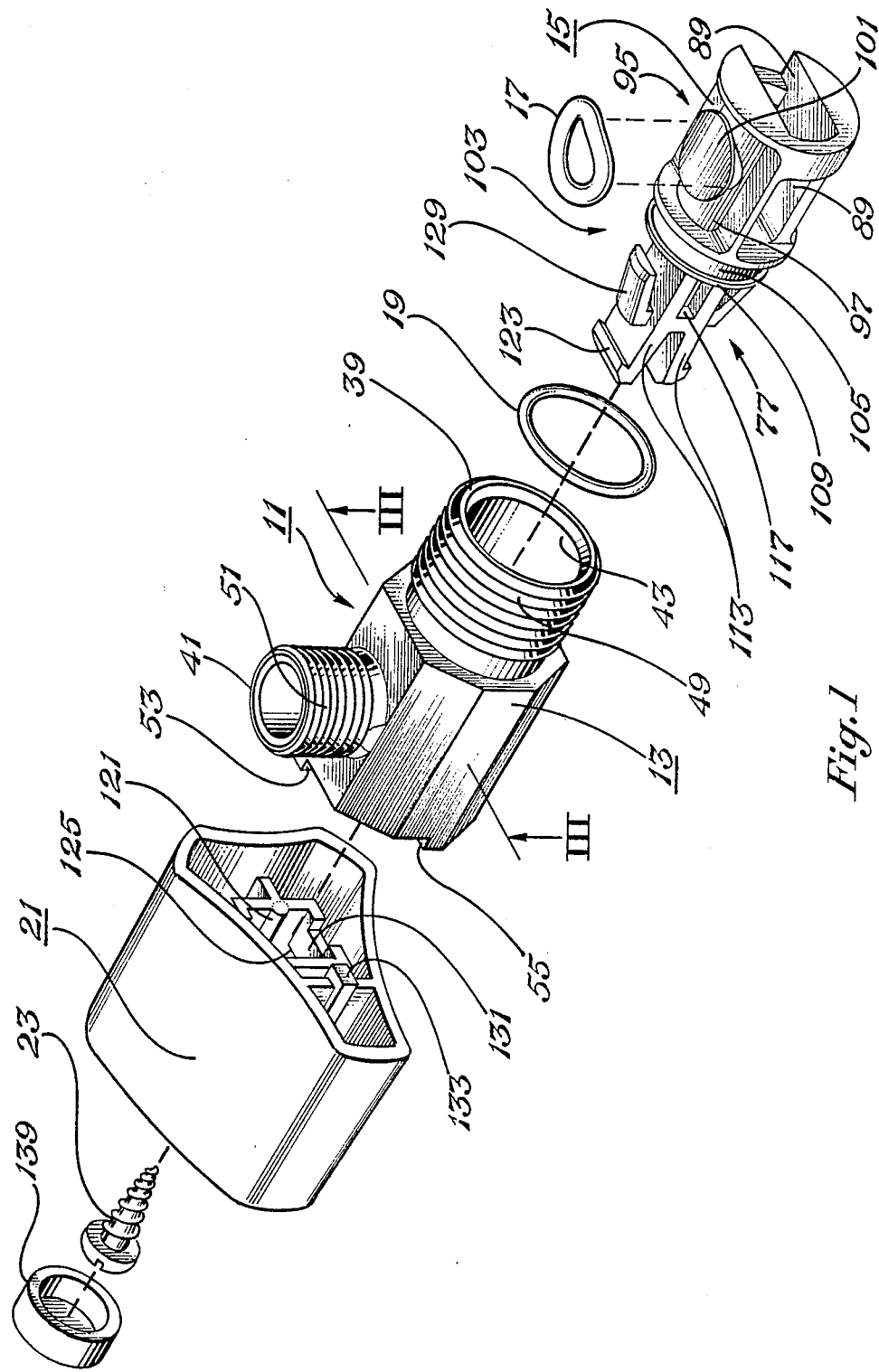
FIG. 1 is an exploded isometric view of the stop valve of the present invention, in accordance with a preferred embodiment.

In FIG. 1, there is shown an exploded isometric view of the stop valve 11 of the present invention, in accordance with a preferred embodiment. The stop valve 11 includes a valve body 13, a valve stem 15, an elastomeric outlet seal ring 17, an elastomeric stem O-ring 19, a handle 21, and a stem screw 23.

Referring to FIGS. 1–3, the valve body 13 has first and second ends 27, 29 and a cylindrical cavity 31 that extends longitudinally from the first end toward the second end. The cylindrical cavity 31 has a first end wall 33 which has a circular opening 35 for receiving part of the valve stem 15. The cylindrical cavity 31 also has a smooth side wall 37. The valve body 13 has an inlet 39 and an outlet 41. The inlet 39 has an inlet opening 43 that communicates with the cylindrical cavity 31 and the outlet has cylindrical outlet opening 45 that also communicates with the cylindrical cavity 31. The inlet opening 43 merges with a chamfer 46 that in turn merges with the cylindrical cavity 31. The outlet opening 45 has a side wall 47 that intersects the side wall 37 of the cylindrical cavity 31. The central axis of the outlet opening 45 is perpendicular to the longitudinal axis of the cylindrical cavity 31. The inlet 39 and the outlet 41 have respective exterior threads 49, 51 for connection to water supply inlet and outlet pipes (not shown). At the first end 27 of the valve body are open and closed stop surfaces 53, 55. The valve body 13 is made of metal, which is typically brass.

The intersection of the outlet opening side wall 47 and the cylindrical cavity side wall 37 is chamfered 57 to reduce abrasion of the outlet seal ring 17 and to enhance sealing of the outlet opening. The method of chamfering the intersection of the outlet opening 45 and the cylindrical cavity 31 will now be described with reference to FIGS. 8 and 9.

A chamfering tool 59 is used to produce the chamfer 57 of the intersection. The chamfering tool is a conventional tool that has been modified for this particular application. The chamfering tool is bifurcated so as to form flexible arms 61. Each arm has a cutting head 63 that extends outwardly from the respective arm in a radial direction. The outer portion of each unmodified cutting head is generally rectangular in transverse cross-section, having a leading surface, an outer surface, and a trailing surface. In the unmodified cutting head, the leading surface and the outer surface intersect at approximately 90 degrees forming a leading edge, and the outer surface and the trailing surface also intersect at approximately 90 degrees to form a trailing edge. The unmodified chamfering tool is designed for chamfering openings in flat plates or tubular stock where the ratio of the inside diameter of the tubular stock to the diameter of the opening is 3 to 1 or greater. The preferred embodiment of the valve body 13 of the present invention has a ratio of the diameter of cylindrical cavity 31 to the diameter of the outlet opening 45 of about 2.1 to 1. The outlet opening is too large to use a conventional rotating cutting or grinding tool to smooth the intersection. The chamfering tool 59 is modified to chamfer the intersection of the outlet opening side wall 47 and the cylindrical cavity side wall 37 by angling the leading surface 65 of each cutting head 63 inwardly toward the longitudinal axis of the tool so as to make the transverse cross-section of the leading edge 66 more acute than when unmodified. The trailing edge 69 of the chamfering tool 59 is also modified by tapering the outer surface 67 and the trailing surface 68 to bring the trailing edge radially inward a slight distance. The chamfering tool 59 is additionally modified by shortening the distance between the cutting heads 63 and the ends 70 of the arms by removing part of the arm ends 70 to accommodate the small diameter of the cylindrical cavity 31.

The first step in chamfering the outlet opening 45 is the insertion of the modified chamfering tool 59 into the valve body 13 through the outlet opening 45 such that the cutting heads 63 are located inside of the cylindrical cavity 31 and the ends of the arms 61 avoid contact with that portion of the cylindrical cavity that is diametrically opposite of the outlet opening. Then, the chamfering tool 59 is rotated (in the counterclockwise direction in FIG. 8). As the chamfering tool 59 rotates, it is extracted from the valve body 13, wherein the intersection of the cylindrical cavity side wall 37 and the outlet opening side wall 47 is chamfered 57. A suitable tool (not shown) grips the stem of the chamfering tool 59 for the chamfering operations. Referring now to FIG. 3, which shows a plan view of the resulting chamfer 57, it will be convenient for the following discussion to refer to "side", "top", and "bottom" with reference to the orientation of FIG. 3. The chamfer 57 has elliptical contours indicating that more material has been removed from the sides 71 of the intersection than the top and bottom 73 portions. During the extraction of the rotating chamfer tool 59, the arms 61 flex inwardly due to the resistance of the valve body 13 against the cutting heads 63. This inward flexing minimizes the amount of material removed from the sides 71 of the intersection. If the chamfering tool arms 61 did not flex inwardly, then the sides of the chamfer would extend farther out from the outlet opening, thus necessitating a seal ring 17 of larger diameter than is required with a chamfered outlet opening machined by a flexible chamfering tool. After chamfering, the cylindrical cavity is then burnished to smooth the surface of the cylindrical cavity side wall and the chamfered intersection.

The chamfering process can be performed economically because the process is easily incorporated into present operations utilized in manufacturing the valve body 13. The valve body 13 is milled from solid brass stock to form the inlet 39, the inlet opening 43, the cylindrical cavity 31, the outlet 41, and the outlet opening 45. The inlet and the outlet are milled to form the exterior threads 49, 51. The chamfering process can be carried out simultaneously with the threading operation of the outlet 41. The chamfering process may thus be performed on the same milling machinery as the other manufacturing processes and does not require the removal of the valve body from the milling machinery, thereby making chamfering economically feasible.

The valve stem 15 includes a cylindrical cavity portion 75 and a handle portion 77 (see FIGS. 1, 4 and 5). The cylindrical cavity portion 75 has an inlet end 79 and a first end wall end 81. The cylindrical cavity portion 75 is generally U-shaped (as seen in FIG. 4 wherein the U is inverted) with the open portion of the U being at the inlet end 79. The sides of the U are formed by first and second walls 83, 85 which are joined at the inlet end by coupling portions 87. A passage 89 is formed between the first and second walls 83, 85 and which extends to the inlet end 79. The cylindrical cavity portion 75 has first and second bearing surfaces 91, 93. The first bearing surface 91 is near the first end wall end 81 and extends around the circumference of the cylindrical cavity portion 75. The second bearing surface 93 is at the inlet end 79 and extends around a majority of the circumference of the cylindrical cavity portion.

The cylindrical cavity portion 75 of the stem 15 has outlet seal ring retainer means 95 located on the first wall 83, wherein the outlet seal ring 17 is retained on the periphery of the valve stem. The first wall 83 has an outer surface 97 that is partially cylindrical. The outlet seal ring retainer means 95 includes a cylindrical projection 99 and a flange 101. The cylindrical projection 99 projects radially outward from the outer surface 97 of the first wall 83. The flange 101, which is on the outer end of the cylindrical projection 99, is shaped to conform the outlet seal ring 17 to the cylindrical cavity side wall 37. The radius of the partially cylindrical outer surface 97 is such that the outlet seal ring 17 is compressed between the partially cylindrical outer surface 97 of the stem 15 and the side wall 37 of the cylindrical cavity 31 a sufficient amount to effect a seal around the outlet opening 45 even in the absence of water pressure. There is a small compensating projection 104 on the second bearing surface 93 located 180 degrees from the cylindrical projection 99. The compensating projection 104 keeps the stem 15 centered in the cylindrical cavity by compensating for the compressive forces of the outlet seal ring 17 that tend to push the stem in a direction that is opposite from the outlet seal ring (see FIG. 2).

The cylindrical cavity portion 75 of stem 15 also has stem seal retainer means 103 located at the first end wall end. The stem seal retainer means 103 includes a cylindrical surface 105, a shoulder portion 107, and a flange portion 109 (see also FIG. 6). The cylindrical surface 105 receives the stem O-ring 19 and is coaxial with the longitudinal axis of the stem 15. The shoulder portion 107 is located adjacent to the first bearing surface 91 so as to be interposed between the first bearing surface and the cylindrical surface 105. The flange portion 109 is positioned adjacent to the cylindrical surface 105 so that the cylindrical surface is interposed between the shoulder portion 107 and the flange portion 109. The flange portion 109 has a diameter that is slightly greater than the inside diameter of the stem O-ring 19 such that when the stem O-ring is assembled onto the cylindrical surface 105, which assembly is over the flange portion, the stem O-ring is not unduly stretched as it passes over the flange portion, yet the diameter of the flange portion is large enough to retain the stem O-ring onto the cylindrical surface once assembled thereon. Thus, the stem O-ring 19 is retained in place by both the flange portion 109 and the shoulder portion 107. An inclined surface 111 is interposed between the flange portion 109 and the cylindrical surface 105 and inclines radially inward from the flange portion to the cylindrical surface. The inclined surface 111 aids in the sealing action of the stem O-ring 19, which will be described in more detail hereinafter.

The stem handle portion 77 includes two rectangular members 113, each of which is rectangular in transverse cross-section, that extend longitudinally from the first end wall end 81 of the cylindrical cavity portion 75. The rectangular members 113 form a drive portion that is generally rectangular in transverse cross-section, particularly at the outer end portions of the rectangular members (see FIG. 9). The rectangular members 113 are connected together at their inner end portions by a longitudinal web 115 in a transverse web 117. The transverse web 117 has a recess 119 for receiving a spline 121 on the handle 21 for orientation. At their outer end portions, the rectangular members 113 are separated from one another by a slot 122. At the outer ends of the rectangular members are handle retainer means in the form of lips 123 that project radially outward to engage shoulder surfaces 125 in the handle (see FIG. 2). The surfaces 127 of the lips that contact the handle shoulder surfaces are tapered radially inward and toward the outer ends of the rectangular members 113. The shoulder surfaces 125 of the handle are similarly tapered for a mating engagement. The rectangular members 113 have stem retainer means 129 for retaining the stem 15 in position relative to the valve body 13. The stem retainer means includes flexible ears 129 that extend outwardly from the respective rectangular members 113 and toward the cylindrical cavity portion 75 of the stem. At their widest expanse, the distance between the two ears 129 exceeds the diameter of the opening 35 in the first end wall 33 of the valve body. The ears 129 are aligned in an imaginary plane that also contains the central line of the outer seal ring retainer means 95 and the compensating projection 104.

The stem is made of plastic material such as acetal. The design of the stem enables its manufacture with a twopiece mold, which mold is simpler than the molds required for prior art stems, thereby minimizing production costs. Although the stem has been shown in conjunction with a right angle valve body, where the inlet is 90 degrees apart from the outlet, the stem can also be used in a straight through valve body, where the inlet, instead of being located in the second end of the valve body, is located in the cylindrical cavity side wall at a position which is diametrically opposite from the outlet. This is because the configuration of the passage 89 through the stem allows water flow from one side of the stem to the other.

The handle 21 has an opening 131 passing longitudinally therethrough, which opening is rectangular in transverse cross-section (see FIGS. 1 and 9). The opening 131 receives the rectangular members 113 of the stem 15. The spline 121 matingly engages the recess 119 in the stem handle portion 77 to properly orient the handle 21 and the stem 15. The rectangular opening 131 has the tapered shoulder surfaces 125 for engaging the rectangular member lips 123. A stop 133 is provided on the handle to engage the open and closed stop surfaces 53, 55 on the valve body.

To assemble the stop valve 11 (see FIGS. 1 and 2), the outlet seal ring 17 is assembled onto the outlet seal retainer means 95 on the stem 15 such that the seal ring is located between the flange 101 and the partially cylindrical surface 97. The stem O-ring 19 is assembled onto the stem cylindrical surface 105 by passing the O-ring over the handle portion 77 and the flange portion 109. Because the diameter of the flange portion 109 is only slightly greater than the inside diameter of the stem O-ring 19, the stem O-ring is not unduly stretched as it passes over the flange portion. Once assembled onto the cylindrical surface 105, the O-ring is retained on the cylindrical surface, even though the stem may be jostled, dropped or the like. Next, the stem 15 is inserted, handle portion 77 end first, into the valve body cylindrical cavity 31 via the inlet opening 43. The stem 15 is forced all the way into the cylindrical cavity 31 such that the handle portion 77 of the stem protrudes from the first end wall opening 35 and the stem retainer ears 129 have passed entirely through the first end wall opening, wherein the stem retainer ears 129 flex radially inward as they pass through the opening 35 and then snap out to a position where the distance between the ears exceeds the diameter of the first end wall opening. Then, the handle 21 and the stem 15 are aligned such that the handle spline 121 is received by the stem recess 119. The handle 21 is pressed onto the stem 15 forcing the outer ends of the rectangular members 113 to flex inwardly as the rectangular member lips 123 pass through the handle opening 131 and then allowing the lips 123 to snap out to a position where the rectangular member lips engage the handle shoulder surfaces 125. The valve 11 is now assembled. The stem screw 23 may be inserted into the slot 122 formed between the rectangular members 113 to further enhance the retaining action. Use of the stem screw 23 may be required by local plumbing codes. Even without the stem screw, the tapered stem lips 123 and handle shoulders 125 provide sufficient retaining action. A color coded button 139 may be added to the handle to cover the screw 23.

The foregoing disclosure and the showings made in the drawings are merely illustrative of the principles of this invention and are not to be interpreted in a limiting sense.

I claim:

1. A plumbing valve, comprising:
a metal valve body having first and second ends and a cylindrical cavity which has a side wall and a first end wall, said first end wall having an opening for receiving a portion of a valve stem, with said valve body having an inlet opening communicating with said cylindrical cavity and a cylindrical outlet opening communicating with said cylindrical cavity, said outlet opening having a side wall which intersects said cylindrical cavity side wall, said intersection of said outlet opening side wall and said cylindrical cavity side wall being chamfered;
said valve stem having a handle portion and a cylindrical cavity portion, said cylindrical cavity portion of said valve stem being located in said cylindrical cavity such that said valve stem protrudes from said cylindrical cavity through said first end wall opening wherein said handle portion is adapted to coact with handle means, said valve stem being made of plastic and being rotatable so as to move between open and closed positions, said cylindrical cavity portion having stem seal means for sealing around said valve stem adjacent to said first end wall opening and outlet seal means for sealing off said outlet opening from said inlet opening when said valve stem is in the closed position, said outlet seal means comprising a seal ring, said valve stem having a passage that allows communication between said inlet and outlet openings when said valve stem is in the open position, wherein when said valve stem is moved to and from the closed position, said outlet seal ring means is moved across said intersection of said outlet opening and said cylindrical cavity in a contiguous manner;
said stem seal means comprises an O-ring having an inside diameter and said valve stem cylindrical cavity portion further comprises stem O-ring retainer means, said stem O-ring retainer means comprising: a cylindrical surface which is coaxial with the axis of rotation of said valve stem and which receives the stem O-ring; a shoulder portion positioned adjacent to said cylindrical surface and sized to so as to retain said stem O-ring on said cylindrical surface; and a flange portion positioned adjacent to said cylindrical surface such that said cylindrical surface is interposed between said shoulder portion and said flange portion, said flange portion having a diameter that is slightly larger than the inside diameter of said stem O-ring such that said stem O-ring is assembled onto the stem cylindrical surface by way of said flange portion without said stem O-ring being unduly stretched as it passes over said flange portion;

said flange portion being positioned with respect to said cylindrical surface so that when water pressure is applied to said value, said stem O-ring will be forced toward said flange portion, said flange portion having an inclined surface that is contiguous with said cylindrical surface, wherein said inclined surface forces said stem O-ring outwardly when said stem O-ring is forced toward said flange portion.

2. A plumbing valve, comprising:

a metal valve body having first and second ends and a cylindrical cavity which has a side wall and a first end wall, said first end wall having an opening for receiving a portion of a valve stem, with said valve body having an inlet opening communicating with said cylindrical cavity and a cylindrical outlet opening communicating with said cylindrical cavity, said outlet opening having a side wall which intersects said cylindrical cavity side wall, said intersection of said outlet opening side wall and said cylindrical cavity side wall being chamfered;

said valve stem having a handle portion and a cylindrical cavity portion, said cylindrical cavity portion of said valve stem being located in said cylindrical cavity such that said valve stem protrudes from said cylindrical cavity through said first end wall opening wherein said handle portion is adapted to coact with handle means, said valve stem being made of plastic and being rotatable so as to move between open and closed positions, said cylindrical cavity portion having stem seal means for sealing around said valve stem adjacent to said first end wall opening and outlet seal means for sealing off said outlet opening from said inlet opening when said valve stem is in the closed position, said outlet seal means comprising a seal ring, said valve stem having a passage that allows communication between said inlet and outlet openings when said valve stem is in the open position, wherein when said valve stem is moved to and from the closed position, said outlet seal ring means is moved across said intersection of said outlet opening and said cylindrical cavity in a contiguous manner;

said valve stem has outlet seal retainer means for retaining said outlet seal ring which comprises a cylindrical projection that projects radially outward from said valve stem and a flange on the outer end of said projection, said flange being shaped to conform to the cylindrical cavity side wall;

said outlet seal ring is installed onto the projection of said outlet seal retainer means so as to be in contact with said cylindrical cavity side wall;

said stem seal means comprises an O-ring having an inside diameter and said valve stem cylindrical cavity portion further comprises stem O-ring retainer means, said stem O-ring retainer means comprising: a cylindrical surface which is coaxial with the axis of rotation of said valve stem and which receives the stem O-ring; a shoulder portion positioned adjacent to said cylindrical surface and sized so as to retain said stem O-ring on said cylindrical surface; a flange portion positioned adjacent to said cylindrical surface such that said cylindrical surface is interposed between said shoulder portion and said flange portion, said flange portion having a diameter that is slightly larger than the inside diameter of said stem O-ring such that said stem O-ring is assembled onto the stem cylindrical surface by way of said flange portion without said stem O-ring being unduly stretched as it passes over said flange portion;

said flange portion being positioned with respect to said cylindrical surface so that when water pressure is applied to said valve, said stem O-ring will be forced toward said flange portion, said flange portion having an inclined surface that is contiguous with said cylindrical surface, wherein said inclined surface forces said stem O-ring outwardly when said stem O-ring is forced toward said flange portion.

3. The valve of claim 2 wherein the stem O-ring seals on the same surface as the outlet seal ring.

* * * * *